(12) United States Patent
Yamamoto (10) Patent No.: US 8,520,228 B2
(45) Date of Patent: Aug. 27, 2013

(54) IMAGE FORMING APPARATUS, IMAGE FORMING SYSTEM, AND DATA OUTPUT CONTROL METHOD EXECUTED BY IMAGE FORMING APPARATUS

(75) Inventor: Kazuto Yamamoto, Koganei (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 340 days.

(21) Appl. No.: 13/088,629

(22) Filed: Apr. 18, 2011

(65) Prior Publication Data

US 2011/0261383 A1 Oct. 27, 2011

(30) Foreign Application Priority Data

Apr. 27, 2010 (JP) ................. 2010-102392

(51) Int. Cl.
*G06F 3/12* (2006.01)
*G06K 15/12* (2006.01)
*H04N 1/00* (2006.01)

(52) U.S. Cl.
USPC ........ 358/1.13; 358/1.15; 358/1.17; 358/404; 358/405

(58) Field of Classification Search
None
See application file for complete search history.

(56) References Cited

U.S. PATENT DOCUMENTS

2005/0052675 A1* 3/2005 Higuchi ........................ 358/1.13
2007/0229889 A1* 10/2007 Henry et al. ................... 358/1.15

FOREIGN PATENT DOCUMENTS

JP 07-047724 A 2/1995

* cited by examiner

*Primary Examiner* — Twyler Haskins
*Assistant Examiner* — Henok Shiferaw
(74) *Attorney, Agent, or Firm* — Buchanan Ingersoll & Rooney PC (57) ABSTRACT

The image forming apparatus according to the present invention is controlled in such a way that it can generate from document data, original copy data for outputting an original copy of the document data and carbon copy data for outputting a carbon copy of the document data (S103 and S105), start output processing of the generated original and carbon copy data (S104, S106, S107, and S108), determines whether or not the original copy data has been deleted in the middle of the output processing (S109), and gives user a message prompting user to discard the outputted result of the carbon copy data when it is determined that the original copy data has been deleted in the middle of the output processing (S112 and S113).

20 Claims, 10 Drawing Sheets

Shipping Slip

XXX Ishikawa-cho, Hachioji-shi, Tokyo
Mr. A. Yamamoto

Tel. 0426-60-9XXX

ABC Trucking Co., Ltd.
5,000yen (B)

Shipping Slip

XXX Ishikawa-cho, Hachioji-shi, Tokyo
Mr. A. Yamamoto

Tel. 0426-60-9XXX

ABC Trucking Co., Ltd.
5,000yen
No. 1234567890

(C)

File Copy
Shipping Slip

XXX Ishikawa-cho, Hachioji-shi, Tokyo
Mr. A. Yamamoto

ABC Trucking Co., Ltd.
5,000yen
No. 1234567890

| Job number | Carbon copy | Serial number | Carbon copy setting | Destination address | Background color | Insertion text | Insertion position |
|---|---|---|---|---|---|---|---|
| 0001 | Yes | 1234567890 | Original | Paper ejection tray 1 | Same as doc | None | — |
| | | | Copy | Paper ejection tray 2 | Same as doc | None | — |
| | | | Copy | okyaku@aaa.jp | Blue | File Copy | X=10,Y=10 |
| | | | Copy | ¥¥10.10.10.10¥share | Yellow | For Approval | X=10,Y=10 |

IMAGE FORMING APPARATUS, IMAGE FORMING SYSTEM, AND DATA OUTPUT CONTROL METHOD EXECUTED BY IMAGE FORMING APPARATUS

CROSS-REFERENCE TO RELATED APPLICATION

This application is based on Japanese Patent Application No. 2010-102392 filed on Apr. 27, 2010, the contents of which are incorporated herein by reference.

BACKGROUND

1. Technical Field

The present invention relates to an image forming apparatus capable of carbon copy printing, an image forming system including the image forming apparatus, and a data output control method executed by the image forming apparatus.

2. Description of Related Arts

Carbon copy printing generally means a printing method which includes printing an original copy and a carbon copy of the same document data simultaneously in response to a single instruction to an image forming apparatus. As such, the carbon copy printing is particularly useful when user intends to print on a high quality sheet an original copy which serves as a delivery slip or an invoice to a customer, and to print on a regular quality sheet two carbon copies for internal use or for storage.

The Japanese Unexamined Publication No. H07-47724 discloses an image forming apparatus equipped with the carbon copy printing function, which includes a memory for storing information concerning various copy formats such as "Copy for User" and "Copy for Manager" and a printing unit for printing text data in one of the copy formats using the information stored in the memory.

However, the image forming apparatus in the prior art involves simultaneous processing of original and carbon copies in the carbon copy printing, and therefore it may cause the carbon copy to be undesirably outputted even when paper jam error occurs in the middle of the print processing of the original copy. As a result of this, the carbon copy output will remain on a paper ejection tray while original copy has been manually removed from the apparatus for disposal. Generally speaking, a carbon copy output like a delivery slip and an invoice does not make any purpose unless it is coupled with an original copy output. In fact, a carbon copy output without being an original copy could even cause a needless confusion among users as they don't know how to deal with the sole carbon copy output.

The present invention is intended to solve the aforementioned problems, and one of the objectives of the present invention is to provide an image forming apparatus, an image forming system, and a data output control method of the image forming apparatus, which can prevent adverse effects such as user's confusion due to the sole output of the carbon copy data without being accompanied by the original copy data.

SUMMARY

In order to accomplish at least one of the aforementioned objectives, an image forming apparatus reflecting one aspect of the present invention comprises a data generating unit for generating from document data, original copy data for outputting an original copy of said document data and carbon copy data for outputting a carbon copy of said document data, an output unit for outputting said original copy data and said carbon copy data generated by said data generating unit, a determination unit for determining whether or not said original copy data has been deleted in the middle of being outputted by said output unit, and a user message unit for giving user a message prompting user to discard outputted result of said carbon copy data by said output unit when said determination unit determines that said original copy data has been deleted in the middle of being outputted.

Preferably outputting said carbon copy data by said output unit includes printing said carbon copy data on a recoding medium, and said user message unit gives user said message by displaying said message on a display device.

Preferably, outputting said carbon copy data by said output unit includes transmitting said carbon copy data by e-mail to an user-specified address, and said user message unit gives user said message by transmitting said message by e-mail to said user-specified address.

An image forming apparatus reflecting another aspect of the present invention includes a data generating Unit for generating from document data, original copy data for outputting an original copy of said document data and carbon copy data for outputting a carbon copy of said document data, an output unit for outputting at least said original copy data among said original copy data and said carbon copy data generated by said data generating unit, a data saving unit for saving into a user-specified folder designated at least said carbon copy data among said original copy data and said carbon copy data generated by said data generating unit, a determination unit for determining whether or not said original copy data has been deleted in the middle of being outputted by said output unit, and a data deleting unit for deleting said carbon copy data saved by said data saving unit from said user-specified folder if said determination unit determines that said original copy data has been deleted in the middle of being outputted.

Preferably, said image forming apparatus further includes a display unit for displaying a message to notify user that said carbon copy data has been deleted by said data deleting unit.

Preferably, said data saving unit saves said carbon copy data into said user-specified folder within a storage device outside said image forming apparatus by communicating with said storage device via a communication network.

The objects, features, and characteristics of this invention other than those set forth above will become apparent from the description given herein below with reference to preferred embodiments illustrated in the accompanying drawings.

DETAILED DESCRIPTION

The embodiments of this invention will be described below with reference to the accompanying drawings.

Figure 1:
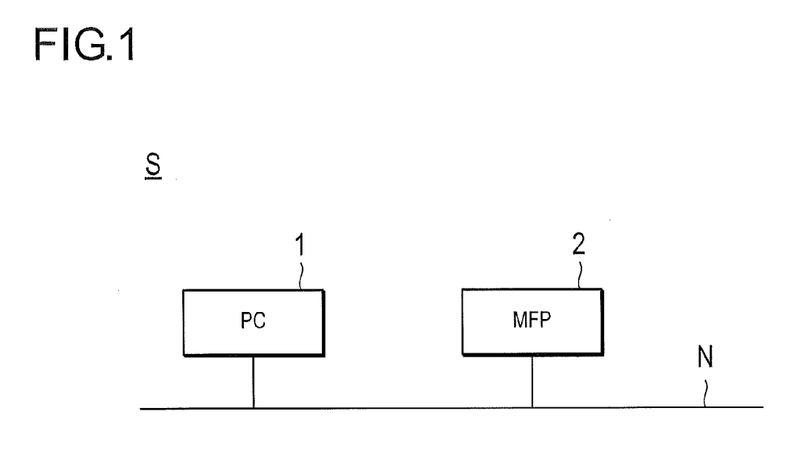
FIG. 1 is a block diagram showing the structure of an image forming system according to an embodiment of the present invention.

FIG. 1 is a block diagram showing the overall configuration of an image forming system S according to an embodiment of the present invention. As can be seen from FIG. 1, the image forming system S includes a PC 1 which serves as a print setting apparatus to generate print data for carbon copy printing, and an MFP 2 which serves as an image forming apparatus to execute print processing based on the print data received from the PC 1, and all of these system components are connected one another via a network N. The network N is a LAN complying with a standard like Ethernet®, Token Ring, FDDI, etc., or a WAN consisting of a plurality of LANs connected one another. The PC 1 and the printer 2 can be locally connected with each other.

Figure 2:
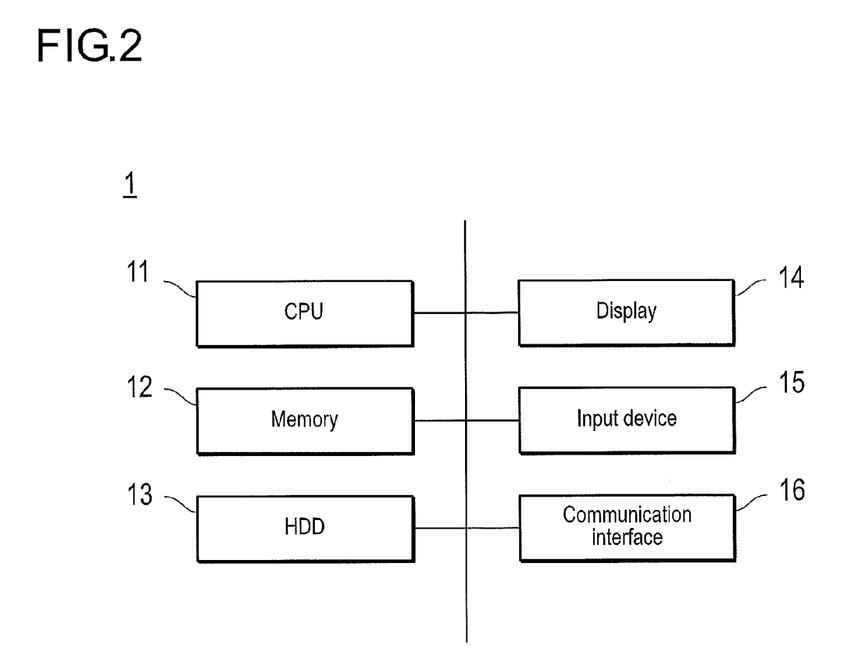
FIG. 2 is a block diagram showing the structure of the PC shown in FIG. 1.

Detailed descriptions of these equipments are shown below. FIG. 2 is a block diagram showing the structure of the PC 1 according to the present embodiment. As can be seen from FIG. 2, the PC 1 includes a CPU 11, a memory 12, an HDD (Hard Disk Drive) 13, a display unit 14, an input device 15, and a communication interface 16, all of which are connected one another via a bus 207 for exchanging signals. Each of these units will be described below.

The CPU 11 controls the operation of each unit and performs various calculations in accordance with control programs. The memory 12 includes a ROM for storing various programs and data, a RAM for temporarily retaining various data to serve as a working area. The HDD 13 temporarily stores various programs and data like the operating system (OS) of the PC 1. The HDD 13 also stores document application programs to be used for generating document files in various formats, and a printer driver for generating print data based on the generated document files. The document application program mentioned above includes the Microsoft Word®, the Adobe Illustrator®, etc.

The display unit 14 is typically a liquid crystal display for displaying various information to user. In particular, the display unit 14 can display a carbon copy print UI (User Interface) screen to be used for receiving various settings regarding the carbon copy print to be executed by the MFP 2 (see FIG. 6 and FIG. 7). Details on the carbon copy print UI screen will be described later. The input device 15 including a keyboard, a mouse, etc., is used to receive various instructions from user. The communication interface 16 is an interface for connecting the PC 1 to the network N and communicating with the other equipments on the network N including the MFP 2.

Figure 3:
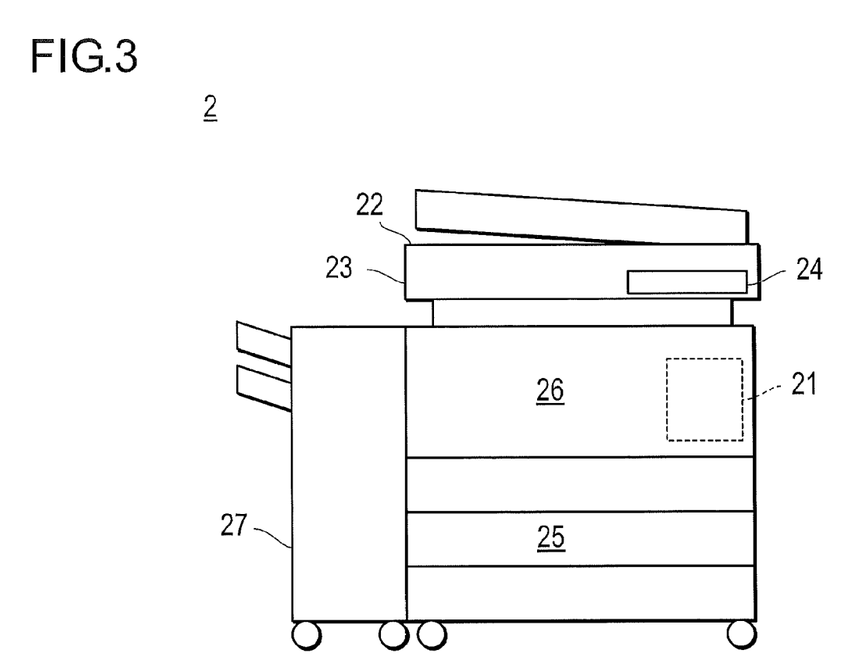
FIG. 3 is a schematic diagram illustrating an external view of the MFP shown in FIG. 1.
Figure 4:
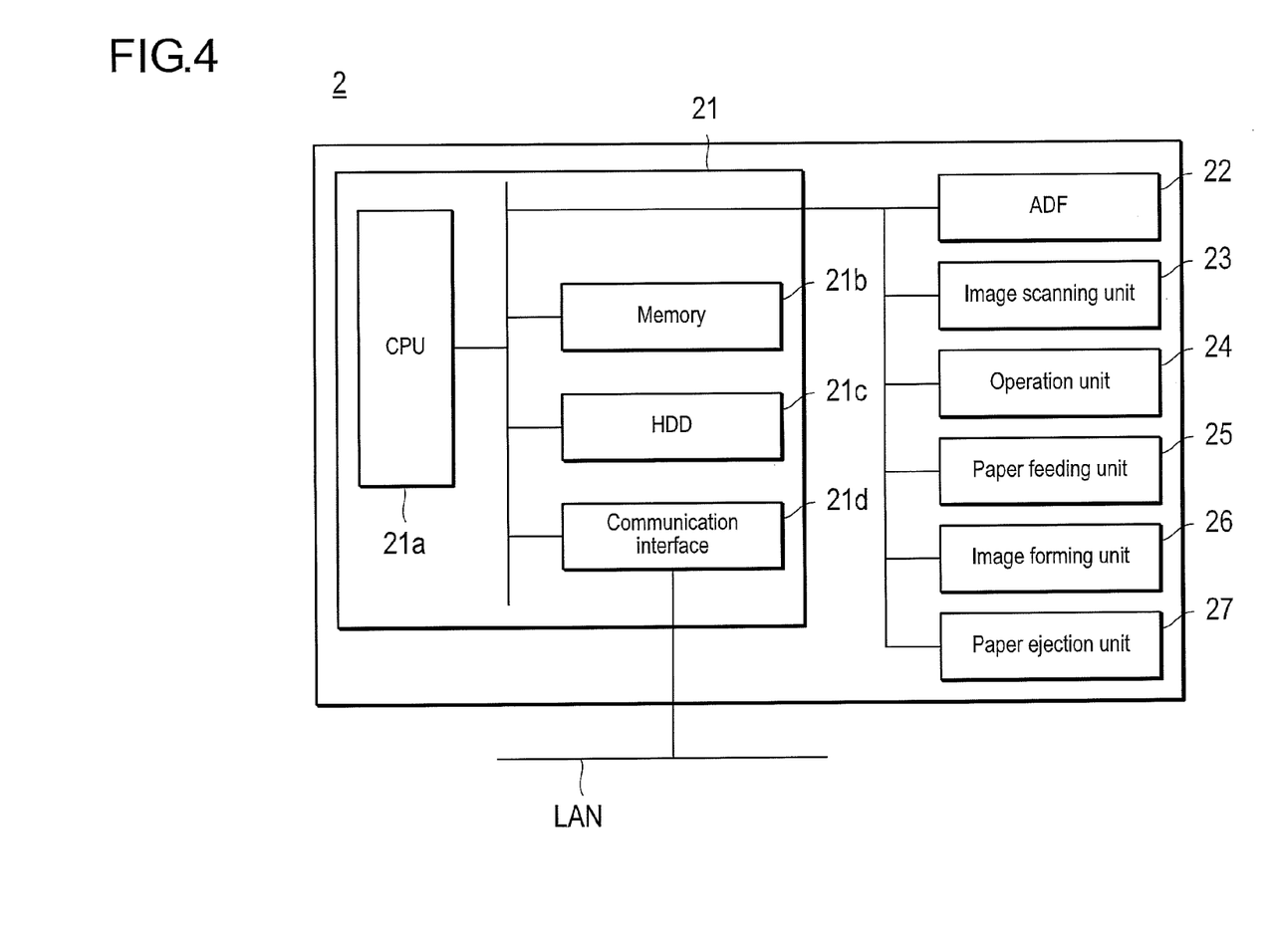
FIG. 4 is a block diagram showing the structure of the MFP shown in FIG. 1.

FIG. 3 is a schematic diagram illustrating an external view of the MFP 2 shown in FIG. 1 while FIG. 4 is a block diagram showing the structure of the MFP 2 shown in FIG. 1. As shown in FIG. 3 and FIG. 4, the MFP 2 includes a control unit 21, an ADF (Auto Document Feeder) 22, an image scanning unit 23, an operation unit 24, a paper feeding unit 25, an image forming unit 26, and a paper ejection unit 27, all of which are connected one another via a bus for exchanging signals. Details on these units will be shown below.

The control unit 21 further includes a CPU 21a, a memory 21b, an HDD 21c, and a communication interface 21d, all of which are connected one another via a bus for exchanging signals.

The CPU 21a controls the operation of each unit and performs various calculations in accordance with control programs. The memory 21b further includes a ROM for storing various programs and data, a RAM for temporarily retaining various programs and data for serving as a working area.

The HDD 21c temporarily stores various programs and data including the operating system (OS) of the MFP 2. In particular, HDD 21c also stores a carbon copy print program to be used for generating and outputting based on the print data received from the PC 1, original copy data for outputting an original copy of the print data as well as carbon copy data for outputting a carbon copy of the print data. Details on the carbon copy print program will be described later. The communication interface 21d is an interface for connecting the MFP 2 to the network N and communicating with the other equipments on the network N including the PC 1.

The ADF 22 is a document conveying device for conveying a multiple-page document placed on a certain initial position page by page to a certain scanning position within the image scanner 23. The image scanner 23 is an image scanning device capable of illuminating the document conveyed manually or automatically to the scanning position with a light source like a fluorescent lamp, converting the scanned image into electrical signals by means of a light-sensitive element such as a CCD image sensor or a CMOS image sensor, and generating image data (bitmap data) from the obtained electrical signals.

The operation unit 24 is an operation panel to be used for displaying status information of the MFP 2 and for receiving various operational instructions. The operation unit 24 also displays certain error messages and warning messages when the original copy data has been deleted in the middle of being its output processing (see FIG. 11 and FIG. 12). Details on these messages will be described later. The paper feeding unit 25 is a paper feeding device for feeding printing paper stored in a plurality of paper feeding trays to the image forming unit one sheet at a time.

The image forming part 26 is a print engine capable of printing images based on the print data on printing paper. The image forming unit 26 executes the electro-photographic print processing which includes a charging step for charging a photoconductive drum, an exposing step for forming an electrostatic latent image on the surface of the photoconductive drum by a laser beam, a developing step for forming a toner image by applying a toner to the latent image on the photoconductive drum, a transferring step for transferring the toner image on the photoconductive drum to the printing paper by a transferring belt, and a fixing step for heating and fixing the toner image transferred to the printing paper by a fixing roller. The image forming unit 26 can also adopt a different printing method such as the impact method, the thermal transfer method, the ink-jet method, instead of the electro-photographic method as described above. The paper ejection unit 27 is a paper ejection device to be used for ejecting to one of the paper ejection trays, the printing paper after having been printed by the image forming unit 26.

Figure 5:
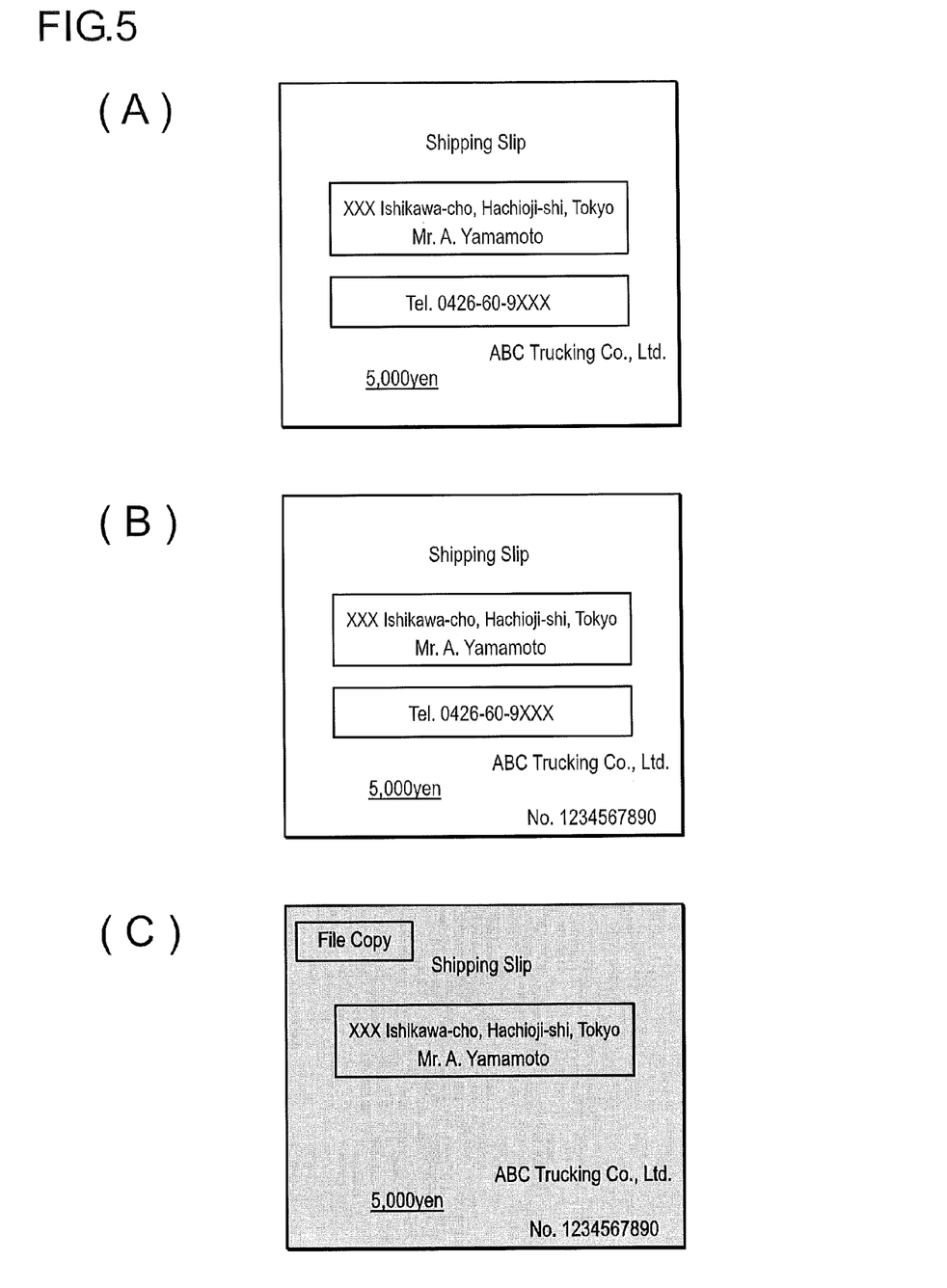
FIG. 5 is a schematic diagram illustrating outputted results of the carbon copy printing by an MFP according to an embodiment of the present invention.

The following is a detail of the carbon copy printing according to the present embodiment. FIG. 5 is a schematic diagram illustrating outputted results of the carbon copy printing executed by an MFP 2. The diagram (A) shows a normal outputted result of the print data for "Shipping Slip" i.e. an outputted result without the carbon copy printing, while the diagrams (B) and (C) show outputted results of the original copy data and the carbon copy data generated in the carbon copy printing based on the same print data as shown in the diagram (A). The print data for carbon copy printing will hereinafter be referred to as "document data".

Comparison of the diagrams (A) and (B) in FIG. 5 reveals that the serial number of the shipping slip i.e. "No. 1234567890" has been inserted to the original copy data shown in the diagram (B), which corresponds to the original copy to be provided to a customer. Comparison of the diagrams (A) and (C) in FIG. 5 also reveals that a mark "File Copy" has been inserted to the carbon copy data shown in the diagram (C), together with the same serial number as the original copy (i.e. "No. 1234567890"), which corresponds to a carbon copy to be filed for internal use. The diagram (C) also shows that the carbon copy data has been provided with a masking to conceal the telephone number (Tel: 0426-60-9xxx), which does not need to appear on a file copy for internal use. Moreover, different background colors are used between the original copy data shown in the diagram (B) and the carbon copy data shown in the diagram (C). The detailed settings for the original copy data and the carbon copy data shown in the diagrams (B) and (C) have been specified by user on the aforementioned carbon copy printing UI screen. This will be described later.

Figure 6:
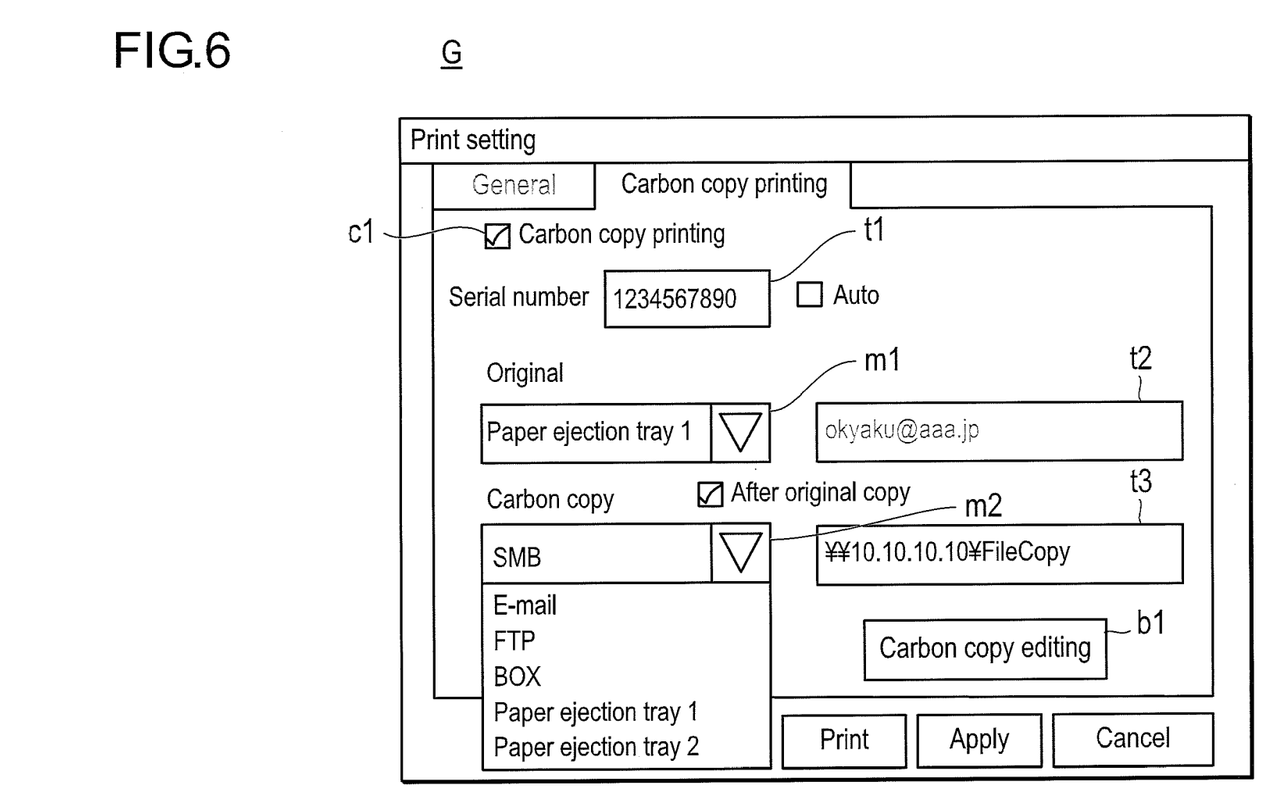
FIG. 6 is a schematic diagram illustrating UI screens for setting the carbon copy printing according to an embodiment of the present invention.

FIG. 6 is a schematic diagram illustrating an initial status of the carbon copy printing UI screen G to be used for receiving various settings regarding the carbon copy printing according to an embodiment of the present invention. This UI screen appears on the display unit when the "Carbon copy printing" tab has been selected by user on a print setting UI screen provided by the printer driver in the PC 1.

In FIG. 6, the carbon copy printing UI screen G is equipped with a check box c1 named "Carbon copy printing" used for activating the carbon copy printing for the current document data, a text box t1 named "Serial number" used for designating a serial number to be inserted to the original copy data and the carbon copy data, an pull-down menu m1 named "Original" used for specifying an output destination of the original copy data, a pull-down menu m2 named "Carbon copy" used for specifying an output destination of the carbon copy data, a text boxes t2 and t3 used for designating an e-mail address and a folder path as destinations of the carbon copy data, and a button b1 named "Carbon copy editing" used for switching to an advanced setting screen for the carbon copy printing. The UI screen G switches to the UI screen G' for advanced settings when user presses the button b1.

Figure 7:
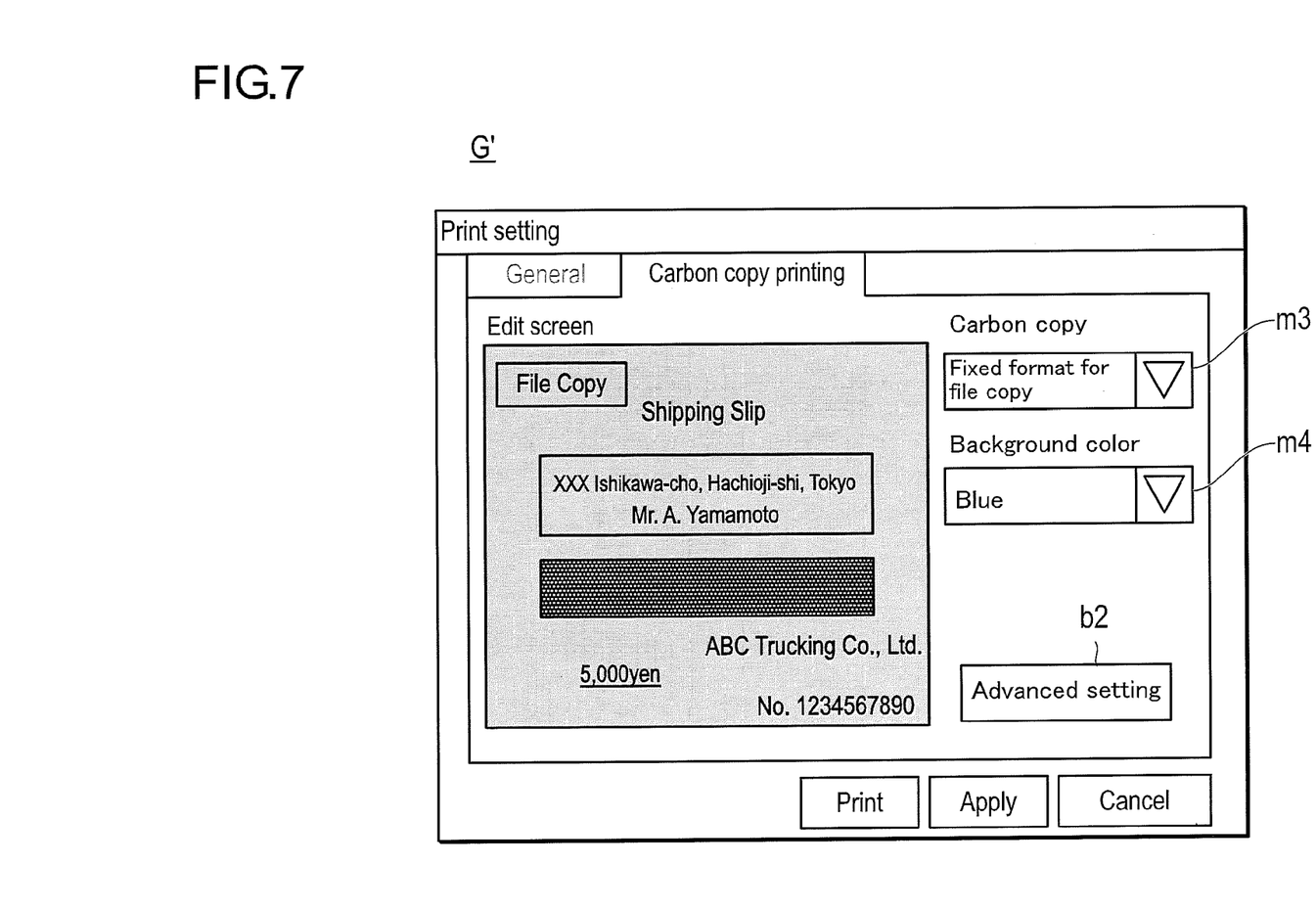
FIG. 7 is a schematic diagram illustrating UI screens for setting the carbon copy printing according to an embodiment of the present invention.

FIG. 7 is a schematic diagram illustrating the UI screen G' for advanced settings. As shown in FIG. 7, this UI screen is equipped with a pull-down menu m3 named "Carbon copy" used for selecting a format applicable to the carbon copy data, a pull-down menu m4 named "Background color" used for selecting a background color of the carbon copy data, a button b2 named "Advance setting" for further advanced setting for the carbon copy data.

Figure 8:
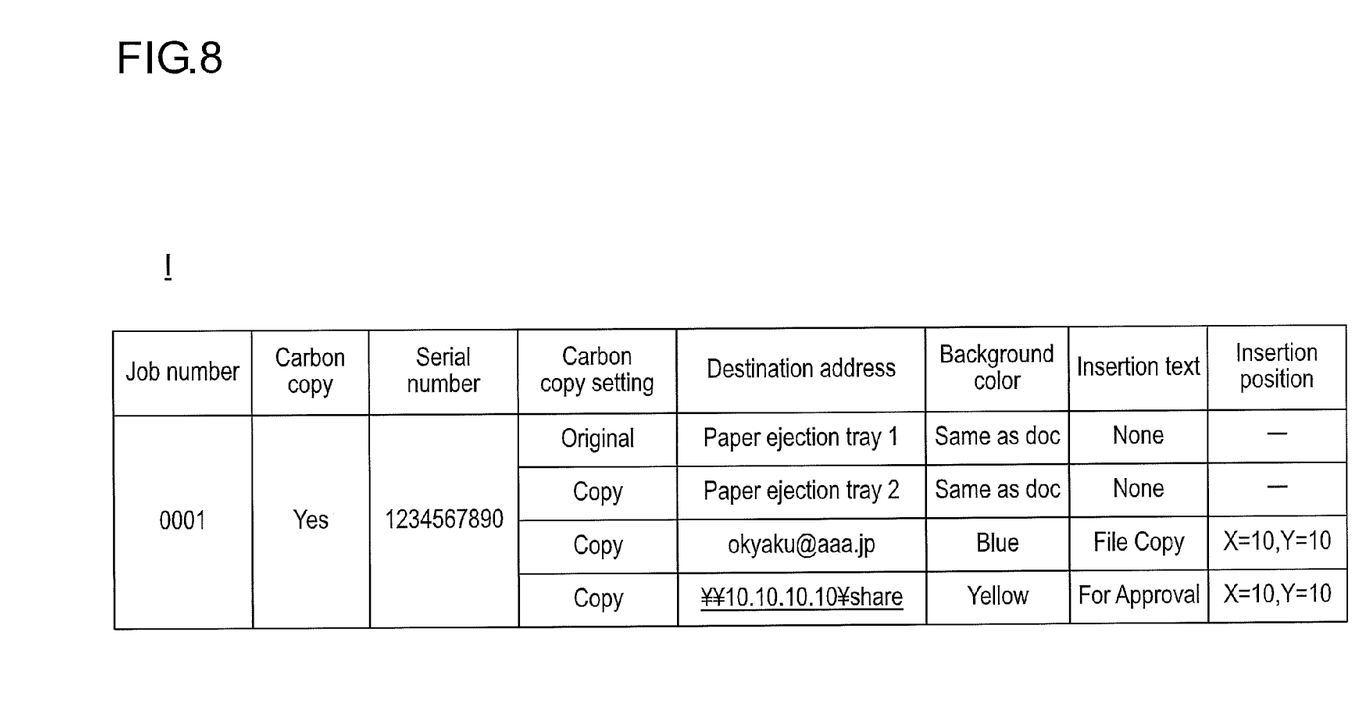
FIG. 8 is a schematic diagram illustrating setting information regarding the carbon copy printing according to an embodiment of the present invention.

The setting information received from user on the UI screen will be transmitted to the MFP 2 as carbon copy setting information. FIG. 8 is a schematic diagram illustrating an example of the carbon copy setting information I according to an embodiment of the present invention. FIG. 8 reveals that the carbon copy information I takes a form of a table containing various items such as "Job number", "Carbon copy", "Serial number", "Carbon copy setting", "Destination address", "Background color", "Insertion text" and "Insertion position", all of which are applicable to the original copy and carbon copy to be outputted by the carbon copy printing. Details on these items will be shown below.

The "Job number" column shows an identification number, of the document data. The "Carbon copy" column indicates whether or not the carbon copy printing should be applied to the document data. The "Yes" mark shown in the column indicates that the carbon copy printing should be applied to the document data. The "Serial number" column shows a serial number such as a shipping slip number to be inserted to the original copy data and carbon copy data based on the document data. This serial number is identical to the user-specified serial number which has been entered in the aforementioned text box t1. In other words, the example shown in FIG. 8 means that the serial number "1234567890" will be inserted to each of the original copy data and carbon copy data.

The "Carbon copy" column indicates whether each print data to be generated and outputted based on the document data corresponds the original copy data or the carbon copy data. The mark "Original" in the column indicates that the relevant data corresponds to the original copy data, and the mark "Copy" indicates that the relevant data corresponds to the carbon copy data. In other words, the example in FIG. 8 indicates that one piece of the original copy data and three pieces of the carbon copy data should be generated and outputted by the carbon copy printing.

The column "Destination address" shows destinations of the original copy data and the carbon copy data. In this column, the mark "Paper ejection tray 1" indicates that the paper ejection tray 1 of the MFP 2 has been specified as an output destination, the mark "Paper ejection tray 2" indicates that the paper ejection tray 2 of the MFP 2 has been specified as an output destination, the mark "Okyaku@aaa.jp" indicates that the same e-mail address has been specified as an output destination, and the mark "¥¥10.10.10.10¥share" indicates that the same folder in the hard disk has been specified as an output destination. In other words, the example in FIG. 8 indicates that the original copy data should be printed by the MFP 2 to be ejected to the paper ejection tray 1, the first carbon copy data should be printed by the MFP 2 to be ejected to the paper ejection tray 2, the second carbon copy data should be transmitted to "Okyaku@aaa.jp" by e-mail, and the third carbon copy data should be saved into the folder "¥¥10.10.10.10¥share". The "Destination address" of the original copy data has been specified by the pull-down menu m1 in FIG. 7, and the "Destination address" of the carbon copy data has been specified by the pull-down menu m2 as well as the text input boxes t2, t3 in FIG. 7.

The column "Background color" shows a background color for each of the original copy data and the carbon copy data. The mark "Same as doc" shown in the column indicates that the same background color as that of the document data should be used, while the marks "Blue" and "Yellow" indicate that blue and yellow should be used as background colors. In other words, the example in FIG. 8 indicates that the same colors as the document data should be used for the original copy data and the first carbon copy data while blue and yellow should be used for the second carbon copy data and the third carbon copy data, respectively. The colors in the column "Background color" have been specified by the pull-down menu m4 in FIG. 7.

The column "Insertion text" shows a text to be inserted to each of the original copy data and the carbon copy data. The mark "None" shown in the column indicates that no text should be inserted to the original copy data or the carbon copy data while the marks "File Copy" and "For Approval" indicates that these texts should be inserted to the original copy data and the carbon copy data. In other words, the example in FIG. 8 indicates that no text should be inserted to the original copy data and the first carbon copy data while the texts "File Copy" and "For Approval" should be inserted to the second carbon copy data and the third carbon copy data, respectively. The texts in the column "Insertion text" have been specified by the pull-down menu m3 in FIG. 7 among certain predefined formats.

The column "Insertion position" shows a position of each "Insertion text" relative to the original copy data and the carbon copy data. The mark "X=10, Y=10" shown in the column indicates that X and Y axis coordinates should be both 10 assuming that the original point is the left top corner of the printing paper, the X-axis is parallel to the horizontal direction, and the Y-axis is parallel to the vertical direction. In other words, the example in FIG. 8 indicates that the insertion text "File Copy" should be inserted to the second carbon copy at the position of "X=10, Y=10" while the insertion text "File Copy" should be inserted to the third carbon copy at the position of "X=10, Y=10". The positions in the "Insertion Position" column have been specified on the advanced editing UI screen (not shown) supposed to appear when user pushes the "advanced editing" button b2 in FIG. 7.

Figure 9:
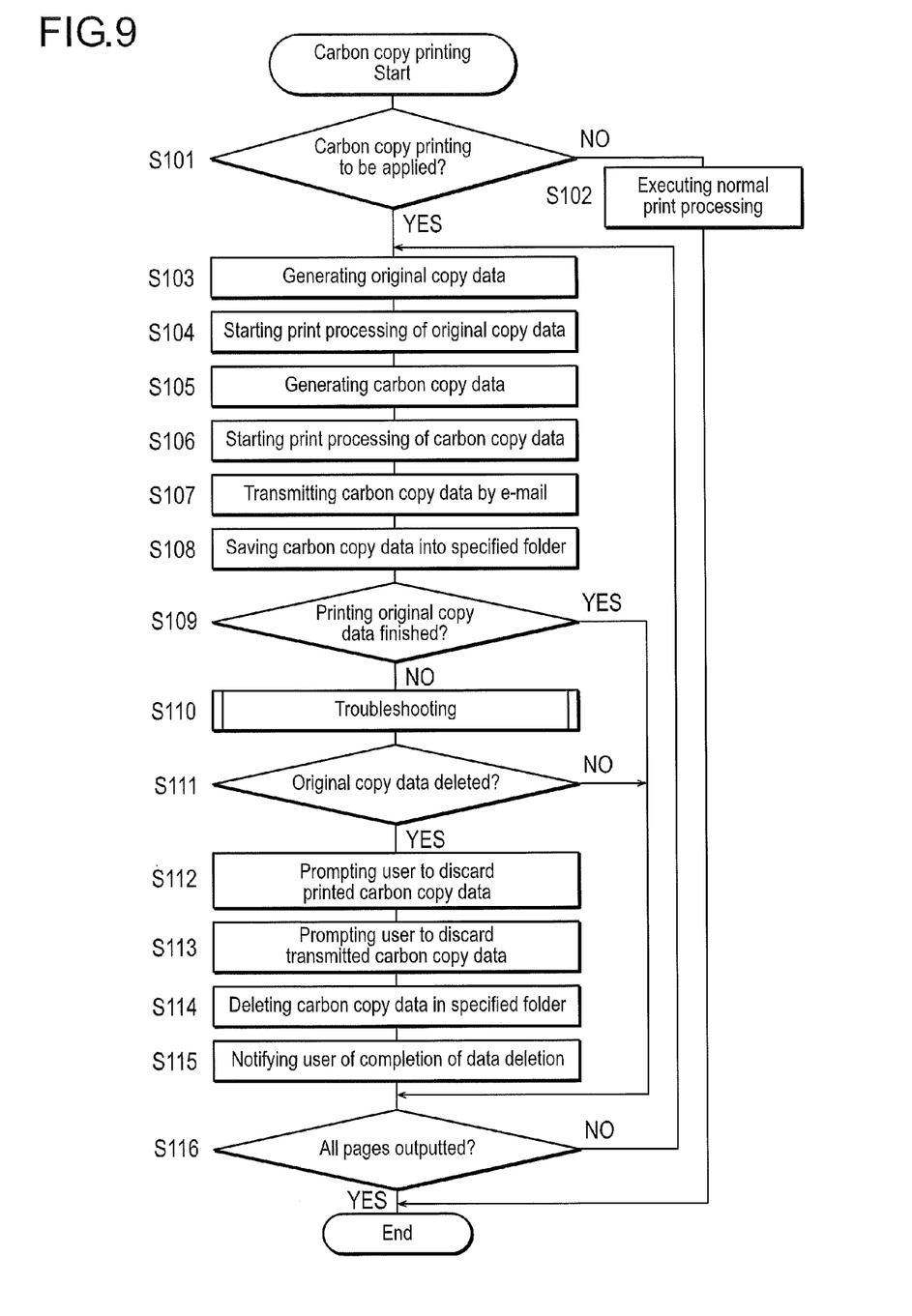
FIG. 9 is a flowchart showing the steps of the carbon copy printing according to an embodiment of the present invention.

The outline of the operation by the MFP 2 according to the present embodiment will be shown below. FIG. 9 is a flowchart showing the steps of the carbon copy printing which the MFP 2 executes when it receives the document data from the PC 1. The algorithm shown in the flowchart in FIG. 9 is stored as a control program in the HDD 21c within the MFP 2, and is read into the memory 21b when the operation starts.

As shown in FIG. 9, the MFP 2 receives the document data, and then determines whether or not a carbon copy printing should be applied to the received document data (S101). More specifically, the MFP 2 refers to the column "Carbon Copy" within the carbon copy setting information I which it received together with the document data.

If the carbon copy printing is not specified in the setting information (S101: No), the MFP 2 executes normal print processing based on the received document data (S102) before finishing the current carbon copy printing. On the other hand, if the carbon copy printing is specified in the setting information (S101: Yes), the MFP 2 executes the steps from S103 to S116 with respect to the received document data on a page-by-page basis.

Firstly, the MFP 2 generates the original copy data for printing an original copy of the document data (S103). More specifically, the MET 2 generates the original copy data by inserting additional information such as "Serial number" and "Insertion text" to the document data, or masking part of the document data to conceal unnecessary information in the document data based on the carbon copy setting information I which the MFP 2 received together with the document data (See the diagrams (A) and (B) in FIG. 5.).

The insertion of the "Serial number" and the "Insertion text" can be achieved by various conventional methods like form overlay printing and watermarking. The Japanese Unexamined Publication No. 2004-155112 discloses an exemplary method for masking part of the document data to conceal unnecessary information.

Next, the MFP 2 starts the print processing based on the original copy data using the image forming unit 26 (S104). The MFP 2 then ejects printed paper to one of the paper ejection tray by the paper ejection unit 27 when it finishes the print processing based on the original copy data.

Next, the MFP 2 generates the carbon copy data for printing a carbon copy of the document data (S105). More specifically, similar to S103, the MFP 2 generates the carbon copy data by inserting additional information such as "Serial number" and "Insertion text" to the document data, or masking part of the document data to conceal unnecessary information included in document data based on the carbon copy setting information I which the MFP 2 has received together with the document data (See the diagrams (A) and (B) in FIG. 5.). Various conventional methods can be used for the insertion and the masking of the carbon copy data in the same way as mentioned above.

Next, the MFP 2 starts the print processing based on the carbon copy data by the image forming unit 26 (S106). However, the MFP 2 will skip S106 if no paper ejection tray is specified as a destination of the carbon copy data in the carbon copy setting information I. The MFP 2 transmits the carbon copy data to the e-mail address contained in the carbon copy setting information I (S107), and then saves the carbon copy data into the specified folder in the carbon copy setting information I (S108). However, the MFP 2 will skip S107 and S108 if no e-mail address is specified as a destination of the carbon copy data in the carbon copy setting information I and if no file folder is specified as a destination of the carbon copy data in the carbon copy setting information I, respectively.

The file folder specified in the carbon copy setting information I can be either a file folder within the HDD 21c of the MFP 2, or a file folder within any external equipments on the network N including PC 1. In the latter case, the carbon copy data will be transmitted to the specified folder using a conventional communication protocol such as FTP and SMB. Next, the MFP 2 determines whether or not it has finished the print processing based on the original copy data which has been initiated in S104 (S109). More specifically, the MFP 2 determines whether or not it has ejected the printed paper to the specified paper ejection tray by the paper ejection unit 27.

Figure 10:
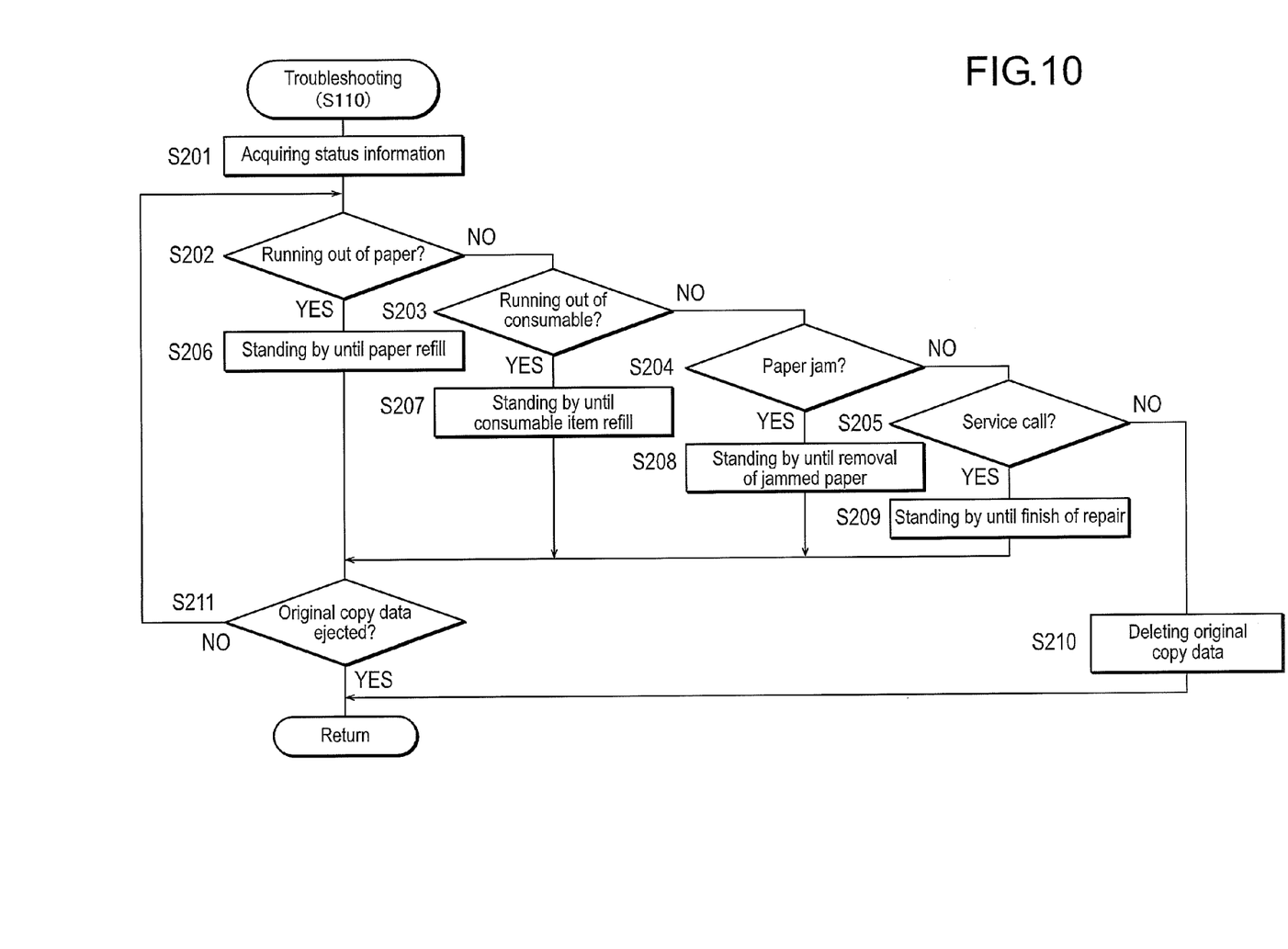
FIG. 10 is a flowchart showing the steps of the troubleshooting according to an embodiment of the present invention.

If the print processing based on the original copy data has been finished (S109: Yes), the MFP 2 moves onto S116 to be described later. On the other hand, if the print processing based on the original copy data has not been finished (S109: No), the MFP 2 moves onto the troubleshooting step (S110) in order to solve the problem which has apparently occurred in the middle of the print processing. FIG. 10 is a flowchart showing the steps of the troubleshooting (S110) according to an embodiment of the present invention. The troubleshooting (S110) is shown below in detail with reference to the chart.

As shown in FIG. 10, the MFP 2 acquires status information of the image forming unit 26 stored in the memory 21b (S201), and then determines based on the acquired information whether or not there has been an error of "Running out of paper", "Running out of consumables", "Paper jam" or "Service call" (S202 to S205).

If the error of "Running out of paper" has occurred (S202: Yes), the MFP 2 will stand by until user finishes refilling printing paper into the paper feeding trays (S206), and then move onto S211 to be described later. If the error of "Running out of consumables" has occurred (S203: Yes), the MFP 2 will stand by until user finishes refilling the consumable items (e.g., toner) (S207), and then move onto S211 to be described later. If the error of "Paper jam" has occurred (S204: Yes), the MFP 2 will stand by until user finishes removing the jammed paper (S208), and then move onto S211 to be described later. If the error of "Service call" error has occurred (S205: Yes), the MFP 2 will stand by until serviceman finishes repair the unit (S209), and then moves onto 5211 to be described later.

On the other hand, if none of the errors "Running out of paper", "Running out of consumables", "Paper jam" nor "Service call" has occurred (S205: No), the MFP 2 can hardly identify the reason why it has not finished ejecting a printed result of the original copy data. Therefore, the MFP 2 returns to the flowchart of FIG. 9 in this case, after deleting the original copy data from the memory 21b (S210).

The MFP 2 determines whether or not it has ejected a printed result of the original copy data yet (S211), and then returns to the flowchart of FIG. 9 if the printed result has been ejected (S211: Yes) while returning to S202 if the printed result has not been ejected (S211: No).

With reference back to the flowchart of FIG. 9, the MFP 2 determines whether or not the original copy data has been deleted (S205: No=>S210) in the troubleshooting in S110 (S111). If the original copy data has been deleted (S111: Yes), the MFP 2 then displays an error message on the operation unit 24 for prompting user to discard the printed result of the carbon copy data (S112). However, the MFP 2 will skip S112 if no paper ejection tray of the MFP 2 is specified as a destination of the carbon copy data.

Figure 11:
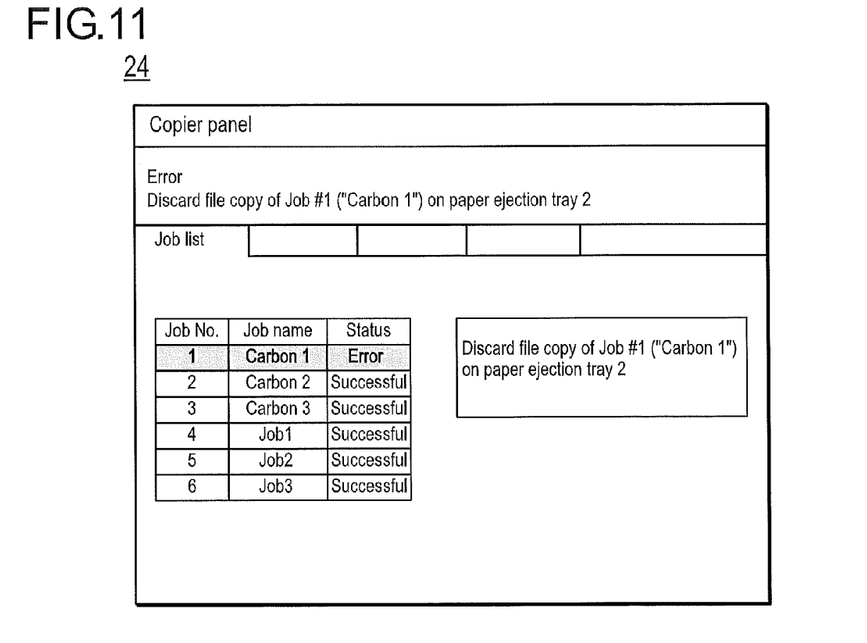
FIG. 11 is a schematic diagram illustrating error messages according to an embodiment of the present invention.

FIG. 11 is a schematic diagram illustrating an error message displayed on the operation unit 24 in S112. In this example, the original copy data of the document data No. 1 (job name: Carbon 1) has been deleted in the middle of the print processing while the carbon copy data of the same document data has finished been printed and ejected to one of the paper ejection tray in a successful manner. The MFP 2 displays an error message on the operation unit 24 for prompting user to discard the printed result of the carbon copy data in order to save user from confusion due to the fact that the outputted carbon copy is not accompanied by the outputted original copy. Like the example shown in the figure, the error message typically states that "Discard file copy of Job #1 ("Carbon 1") on paper ejection tray 2".

After that, the MFP 2 transmits an e-mail message (not shown) prompting user to discard the carbon copy data to the same e-mailed as in S107 (S113). The MFP 2 then deletes the carbon copy data stored in the user-specified folder in S108 (S114), and also displays a warning message on the operation unit 24 to notify user that the carbon copy data has been deleted (S115). Meanwhile, the MFP 2 skips S113 and S114 if no e-mail address is specified as a destination of the carbon copy data, and if no file folder is specified as a destination of the carbon copy data in the carbon copy setting information I, respectively.

Figure 12:
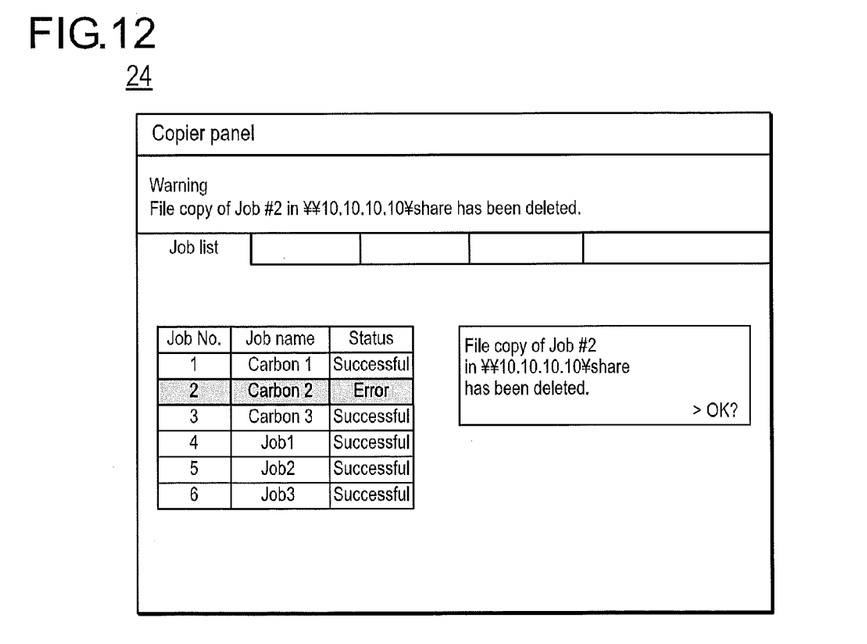
FIG. 12 is a schematic diagram illustrating warning messages according to an embodiment of the present invention.

FIG. 12 is a schematic diagram illustrating an example of the warning message to be displayed on the operation unit 24 in S115. This example shows that the original copy data of Job No. 2 (Job Name: Carbon 2) has been deleted in the middle of the print processing while the carbon copy data of the same document data has been successfully saved into the specified folder. The MFP 2 has also deleted the carbon copy data from the specified folder and displays an warning message on the operation part 24 to notify user of the deletion, in order to save user from the confusion due to the fact that the carbon copy data exists in the specified folder while the original copy data has not been outputted. Like the example shown in the figure, the warning message typically states that "File copy of Job #2 in ¥¥10.10.10.10¥share has been deleted".

The MFP 2 then determines whether or not all the pages of the document data have been outputted (S116), and ends the series of steps when all the pages have been outputted (S116: Yes). On the other hand, the MFP 2 repeats the step S103 onward with respect to the remaining pages if all the pages has not been outputted (S116: No).

According to the present embodiment as explained above, the image forming apparatus determines whether or not the original copy data for the carbon copy printing has been deleted in the middle of the print processing (S111), and gives user an error message prompting user to discard the outputted result of the carbon copy data (S112, S113) and deletes the carbon copy data stored into the specified folder (S114) if it determines that the original copy data has been deleted in the middle of the print processing. Consequently, the present embodiment can prevents user from the confusion caused by the fact that the outputted result of the carbon copy data solely exists although the outputted result of the original copy data does not exist.

The present invention shall not be limited to the aforementioned embodiment, and hence it can be modified within the scope of the appended claims. For example, the aforementioned embodiment stipulates that the carbon copy setting information will be obtained by the UI screen of the printer driver installed in the PC 1, but the carbon copy setting information can also be obtained by the operation panel of the MFP 2. The aforementioned embodiment also stipulates that the print data (i.e. document data) for the carbon copy printing will be transmitted from the PC 1 to the MFP 2 via the Network N, but the print data can also be generated by the image scanning unit 23 of the MFP 2.

The aforementioned embodiment also stipulates that the same output form and destination address will be applied to all the pages of the document data across the board, but a different output forms and destination address can be applied to each page of the document data. This can ensure that the carbon copy data for some pages will be printed out and the carbon copy data for the other pages will be transmitted by e-mail.

The aforementioned embodiment also stipulates that the error and warning messages will be displayed on the operation unit 24 of the MFP 2 if the original copy data has been deleted in the middle of being outputted, but these messages can be displayed on the display 14 of the PC 1 or any other display devices.

The image forming apparatus according to the present embodiment can also be implemented by a dedicated hardware circuit capable of executing the aforementioned steps, or a program executed by a CPU to perform the aforementioned steps. If the present invention is implemented by the latter, the program for controlling the image forming apparatus can take a form of a computer readable recording medium such as a Floppy® disk or CD-ROM, or a downloadable file supplied on-line via a network such as Internet. In the former case, the program recorded in the computer readable recording medium is normally transmitted to a memory unit such as a ROM or a hard disk. The above program can also take a form of an independent application software or a built-in function of the image forming apparatus.

What is claimed is:

1. An image forming apparatus comprising:
   a data generating unit for generating from document data, original copy data for outputting an original copy of said document data, and carbon copy data for outputting a carbon copy of said document data;
   an output unit for outputting said original copy data and said carbon copy data generated by said data generating unit;
   a determination unit for determining whether or not said original copy data has been deleted in the middle of being outputted; and
   an user message unit for giving user a message prompting said user to discard outputted result of said carbon copy data by said output unit when said determination unit determines that said original copy data has been deleted in the middle of being outputted.

2. The image forming apparatus as claimed in claim 1, wherein outputting said carbon copy data by said output unit includes printing said carbon copy data on a recording medium, and said user message unit gives user said message by displaying said message on a display.

3. The image forming apparatus as claimed in claim 1, wherein outputting said carbon copy data by said output unit includes transmitting said carbon copy data by e-mail to an user-specified address, and said user message unit gives user said message by transmitting said message to said user-specified address by e-mail.

4. An image forming apparatus comprising:

a data generating unit for generating from document data, original copy data for outputting an original copy of said document data, and carbon copy data for outputting a carbon copy of said document data;

an output unit for outputting at least said original copy data among said original copy data and said carbon copy data generated by said data generating unit;

a data saving unit for saving at least said carbon copy data into a user-specified folder among said original copy data and said carbon copy data generated by said data generating unit;

a determination unit for determining whether or not said original copy data has been deleted in the middle of being outputted by said output unit; and a data deletion unit for deleting said carbon copy data saved by said data saving unit from said user-specified folder when said determination unit determines that said original copy data has been deleted in the middle of being outputted.

5. The image forming apparatus as claimed in claim 4, further comprising:

a display unit for displaying a message for notifying user that said carbon copy data has been deleted by said data deletion unit.

6. The image forming apparatus as claimed in claim 4, wherein said data saving unit saves said carbon copy data in said user-specified folder within a storage device outside said image forming apparatus by communicating with said storage device via a communication network.

7. An image forming system comprising:

a setting apparatus for transmitting document data as well as setting information concerning output setting of an original copy and a carbon copy of said document data, and an image forming apparatus with a receiving unit for receiving said document data and said setting information from said setting apparatus, a data generating unit for generating from said setting information received by said receiving unit, original copy data for outputting an original copy of said document data, and carbon copy data for outputting a carbon copy of said document data, an output unit for outputting said original copy data and said carbon copy data generated by said data generating unit, a determination unit for determining whether or not said original copy data has been deleted in the middle of being outputted by said output unit; and a user message unit for giving user a message for prompting user to discard outputted result of said carbon copy data by said output unit when said determination unit determines that said original copy data has been deleted in the middle of being outputted.

8. The image forming apparatus as claimed in claim 7, wherein outputting said carbon copy data by said output unit includes printing said carbon copy data on a recording medium, and said user message unit gives user said message by displaying said message on a display device.

9. The image forming apparatus as claimed in claim 7, wherein outputting said carbon copy data by said output unit includes transmitting said carbon copy data by e-mail to an user-specified address, and said user message unit gives user said message by transmitting said message to said user-specified address by e-mail.

10. The image forming apparatus as claimed in claim 7, wherein said setting information includes at least one of insertion setting information regarding insertion of character strings into said document data to be executed by said data generating unit during its generating said original copy data and said carbon copy data, masking setting information regarding masking of said document data to be executed by said data generating unit during its generating said original copy data and said carbon copy data, and output setting information regarding output form of said original copy data and said carbon copy data by said output unit.

11. An image forming system comprising:

a setting apparatus for transmitting document data as well as setting information concerning output setting on original copy and carbon copy of said document data, and an image forming apparatus with a receiving unit for receiving said document data and said setting information from said setting apparatus, a data generating unit for generating from said setting information received by said receiving unit, original copy data for outputting an original copy of said document data and carbon copy data for outputting a carbon copy of said document data, an output unit for outputting at least said original copy data among said original copy data and said carbon copy data generated by said data generating unit, a data saving unit for saving into user-specified folder at least said carbon copy data among said original copy data and said carbon copy data generated by said data generating unit; a determination unit for determining whether or not said original copy data has been deleted in the middle of being outputted by said output unit, and a data deleting unit for deleting from said user-specified folder said carbon copy data saved by said data saving unit when said determination unit determines that said original copy data has been deleted in the middle of being outputted.

12. The image forming system as claimed in claim 11, further comprising:

a display unit for displaying a message for notifying user that said carbon copy data has been deleted by said data deleting unit.

13. The image forming system as claimed in claim 11, wherein said data saving part saves said carbon copy data into said user-specified folder within a storage device outside said image forming apparatus by communicating with said storage device via a communication network.

14. The image forming system as claimed in claim 11, wherein
said setting information includes at least one of insertion setting information regarding insertion of character strings into said document data to be executed by said data generating unit during its generating said original copy data and said carbon copy, masking setting information regarding masking of said document data to be executed by said data generating unit during its generating said original copy data and said carbon copy data, and output setting information regarding output form of said original copy data and said carbon copy data by said output unit.

15. A data output control method executed in an image forming apparatus comprising steps of:
(A) generating from document data, original copy data for outputting an original copy of said document data and carbon copy data for outputting a carbon copy of said document data;
(B) starting output processing of said original copy data and said carbon copy data generated in said step (A);
(C) determining whether or not said original copy data has been deleted in the middle of said output processing started in said step (B); and
(D) giving user a message prompting user to discard outputted result from said output processing started in said step (B) when it is determined in said step (C) that said original copy data is deleted in the middle of said output processing.

16. The data output control method as claimed in claim 15, wherein
said output processing of said carbon copy data started in said step (B) includes printing said carbon copy data on a recording medium, and
in said step (D) user is given said message being displayed on a display device.

17. The data output control method as claimed in claim 15, wherein
said output processing of said carbon copy data started in said step (B) includes transmitting said carbon copy data by e-mail to an user-specified address, and
in said step (D) user is given said message being transmitted by e-mail to said user-specified address.

18. An data output control method executed in an image forming apparatus comprising steps of:
(A) generating from document data, original copy data for outputting an original copy of said document data and carbon copy data for outputting a carbon copy of said document data;
(B) starting output processing of at least said original copy data among said original copy data and said carbon copy data generated in said step (A);
(C) saving into an user-specified folder at least said carbon copy data among said original copy data and said carbon copy data generated in said step (A);
(D) determining whether or not said original copy data has been deleted in the middle of said output processing of said original copy data started in said step (B); and
(E) deleting said carbon copy data saved in said step (C) from said user-specified folder when it is determined in said step (D) that said original copy data has been deleted in the middle of said output processing.

19. The data output control method as claimed in claim 18, further comprising a step of:
(F) displaying on a display device a message to notifying user that said carbon copy data has been deleted in said step (E).

20. The data output control method as claimed in claim 18, wherein
in said step (C) said carbon copy data is saved into said user-specified folder within a storage device outside said image forming apparatus by means of communication with said storage device via a communication network.

* * * * *